(12) United States Patent
Park et al.

(10) Patent No.: US 6,168,689 B1
(45) Date of Patent: Jan. 2, 2001

(54) METHOD AND APPARATUS FOR CLEANING EXHAUST GAS DISCHARGED FROM INTERNAL OR EXTERNAL COMBUSTION ENGINE BY USING HIGH VOLTAGE ELECTRIC FIELD

(75) Inventors: Chan-Ho Park, Seoul; Yong-Hee Lee, Kyungki-do, both of (KR)

(73) Assignee: Seondo Electric Co., Ltd., Kyungki-do (KR)

( * ) Notice: Under 35 U.S.C. 154(b), the term of this patent shall be extended for 0 days.

(21) Appl. No.: 09/105,649

(22) Filed: Jun. 26, 1998

Related U.S. Application Data

(63) Continuation-in-part of application No. PCT/KR96/00007, filed on Jan. 19, 1996.

(30) Foreign Application Priority Data

Dec. 28, 1995 (KR) .................................................. 95-61243

(51) Int. Cl.[7] .................................................... B01J 19/08
(52) U.S. Cl. ................... 204/164; 204/177; 422/186.04; 422/186.3; 588/227
(58) Field of Search .................................... 204/164, 177; 422/186.04, 186.3; 588/227

(56) References Cited

U.S. PATENT DOCUMENTS 4,871,515   10/1989   Reichle et al. .......................... 60/275

FOREIGN PATENT DOCUMENTS 1224639   10/1971   (GB) .
2287630    9/1995   (GB) .

*Primary Examiner*—Kishor Mayekar
(74) *Attorney, Agent, or Firm*—Dilworth & Barrese

(57) ABSTRACT

A method and an apparatus for cleaning smoke and reducing noises of an internal combustion engine or external combustion engine by using a high voltage field. The present invention relates to a method and an apparatus which can clean exhaust gases and reduce noise, wherein it comprises the step of burning up the granular particles with corona discharge after changing particles into plasma state, the step of removing gaseous materials with negative ions, the step of eliminating NOx with ultraviolet rays and the step of reducing noise.

31 Claims, 16 Drawing Sheets

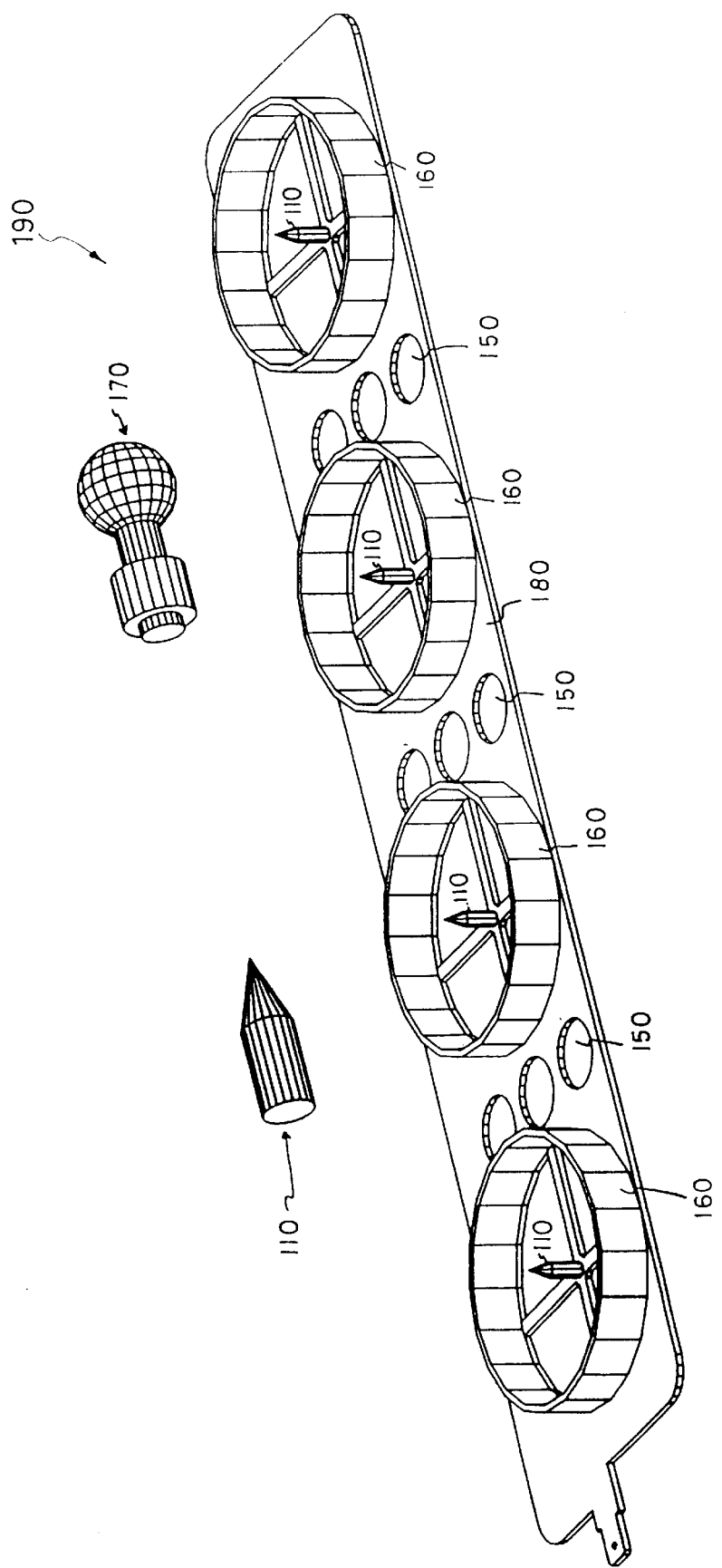

METHOD AND APPARATUS FOR CLEANING EXHAUST GAS DISCHARGED FROM INTERNAL OR EXTERNAL COMBUSTION ENGINE BY USING HIGH VOLTAGE ELECTRIC FIELD

This is a continuation-in-part of copending International application No. PCT KR96/00007 filed Jan. 19, 1996.

TECHNICAL FIELD

The present invention relates to a method and an apparatus to clean exhaust gas conveying through the chamber, by burning up granular particles under plasma atmosphere, by removing chemical gaseous materials with negative ions, and by eliminating NOx with ultraviolet rays,
which are induced by high voltage electric field. Specifically, the present invention relates to a method and an apparatus which can clean exhaust gas and reduce noise, wherein the method comprises the step of burning up the granular particles with corona discharge after changing particles into plasma state, the step of eliminating NOx with ultraviolet rays, and the step of reducing noise.

The main cause of circumstance pollution are smoke and noise produced by industrial equipments and automobiles. Especially, diesel engines are popularly used, by virtue of their high power and low cost. By the way, in the event of using diesel engines, there occur some problems because diesel engines push out smoke including granular particles, hydrocarbons, NOx, noise and so on, which must be solved to prevent the circumstantial pollution. In order to solve these problems, intensive studies have been carried out about cleaning exhaust gas and reducing noise.

BACKGROUND OF ART

Heretofore known methods make use of catalytic filters, electric field and recombustion of exhaust gas.

In DE 3834920, the system has been described, wherein it burns up the deposited carbon particles in ceramic filter with ozone produced by electric field of 20 KHz and 20 MV.

In WO 9200442, method and device have been described, wherein exhaust gases are taken into a channel of ceramic body where an electric field is generated across the direction of flow, and the soot particles deposited on the walls of the channel are first negatively charged by a discharge electrode and then oxidized by ions adhering to oxygen.

In DE 3711312, the method and apparatus have been described, wherein particles are removed by being ionized with UV rays and by being collected to the plate.

In DE 3314168, the system have been described, wherein neutral particles are divided into two side streams which are directed over electrodes of large surface area, held at opposite potentials.

In U.S. Pat. No. 5,074,112, an apparatus has been described, wherein a filter disposed within the cavity removes particulate products of combustion from exhaust gases passing the cavity and electromagnetic waves produce heat for incinerating particulate products of combustion.

As described above, conventional methods can be applied to eliminate only a kind of soot particle, and so the other ingredients including NOx and noise are pushed out without eliminating.

Accordingly, the inventors of the present invention invented a method and apparatus for cleaning exhaust gas as well as reducing engine noise.

SUMMARY OF THE INVENTION

An object of this invention is to provide a method and an apparatus for cleaning exhaust gas pushed out from engines or industrial equipments and reduce engine noise.

Specially, the object of the present invention is to provide method and apparatus which can clean exhaust gas and reduce engine noise, by partitioning the granular particles and noxious materials in exhaust gas, and then by burning up directly the granular particles under plasma atmosphere, by burning up again the minute particles by means of DC high voltage and AC high voltage, by removing noxious materials with negative ions, by removing NOx by oxidizing it into $NO_3$ with ultraviolet rays and ozone, which can be easily dissolved in water which is produced by Sellen's effect of PN diode in this apparatus, and by cutting off engine noise and electromagnetic interference.

The apparatus in the present invention is divided into seven units in order to enhance productivity and efficiency of after-service, which can be used in combination or in separately according to the kind of exhaust gas since it has an exhaust gas reducing effect in each unit.

In this invention, a partition unit renders exhaust gas to pass through at high speed and burns up particles which have been collected the partition unit.

In the partition unit, to pass exhaust gas at high speed, EHD(electro-hydro dynamics) method and electrostatic method are applied at a bottle necked nozzle to accelerate the flow of exhaust gas.

The negatively charged particles accelerate much more by voltage difference between an ion pin and attractor electrode, and therefore staying or slowing down of exhaust gas in a chamber is prevented.

The negatively charged particles are attracted by electrostatic force on the collector electrode which is made of a metal mesh and particles which can not pass through the collector electrode of a metal mesh drop down into the manhole where one set of discharge poles is disposed to burn up large particles.

In plasma unit, particles passed through collector electrode are burned by using corona process, wherein small particles are burned by streamer corona generated between a plasma unit pole and mesh. In order to clean exhaust gas more efficiently, exhaust gas is conveyed to electron unit after passing through the plasma unit. Electron unit burns up minute particles by means of DC high voltage and AC high voltage. AC high voltage is applied across a pole plate and hole plate in order to generate streamer corona to burn up minute particles.

DC high voltage is applied across the hole plate and ion pin which pushes particles to the hole plate in order to enhance the efficiency of corona discharge between the hole plate and pole plate.

By the above-mentioned process, granular ingredients of exhaust gas are nearly cleared.

Also, there are noxious chemical materials including NOx in exhaust gas, which are removed with negative ions generated by ionization unit which generates UV rays between plasma jet and opposite electrode, and this UV rays generate a great deal of negative ions. Noxious materials combine with negative ions and ozones to be changed into other materials.

In order to remove NOx which is not removed in the above-mentioned ionization unit, a screen unit is used.

The screen unit comprises a first ceramic plate, and second ceramic plate having hexagonal holes in which PN diodes are disposed.

By action of 10K voltage applied across the plates, UV rays are generated around hexagonal hole in a large amount, and these UV rays let $O_2$ to be changed into ozone. In addition, PN diodes cause temperature dropping by Sellen's effect to condense gaseous $H_2O$ into water. During above process, the efficiency of removing NOx will be enhanced by taking air into plates.

This invention can contain a union unit, which absorbs engine noise and shields electromagnetic wave to be radiated by high frequency. Union unit is used to meet the regulations of EMI, EMC specification of this inventive apparatus.

According to the above, this invention can clear exhaust gas and can be substituted for a noise absorber.

BRIEF DESCRIPTION OF THE DRAWINGS

This object, and other objects and advantages of the present invention, will appear more clearly from the following specification in conjunction with accompanying schematic drawing, in which:

FIG. 3(a) is an assembling embodiment of a partition unit components;

DETAILED DESCRIPTION OF THE PREFERRED EMBODIMENTS

Figure 1:
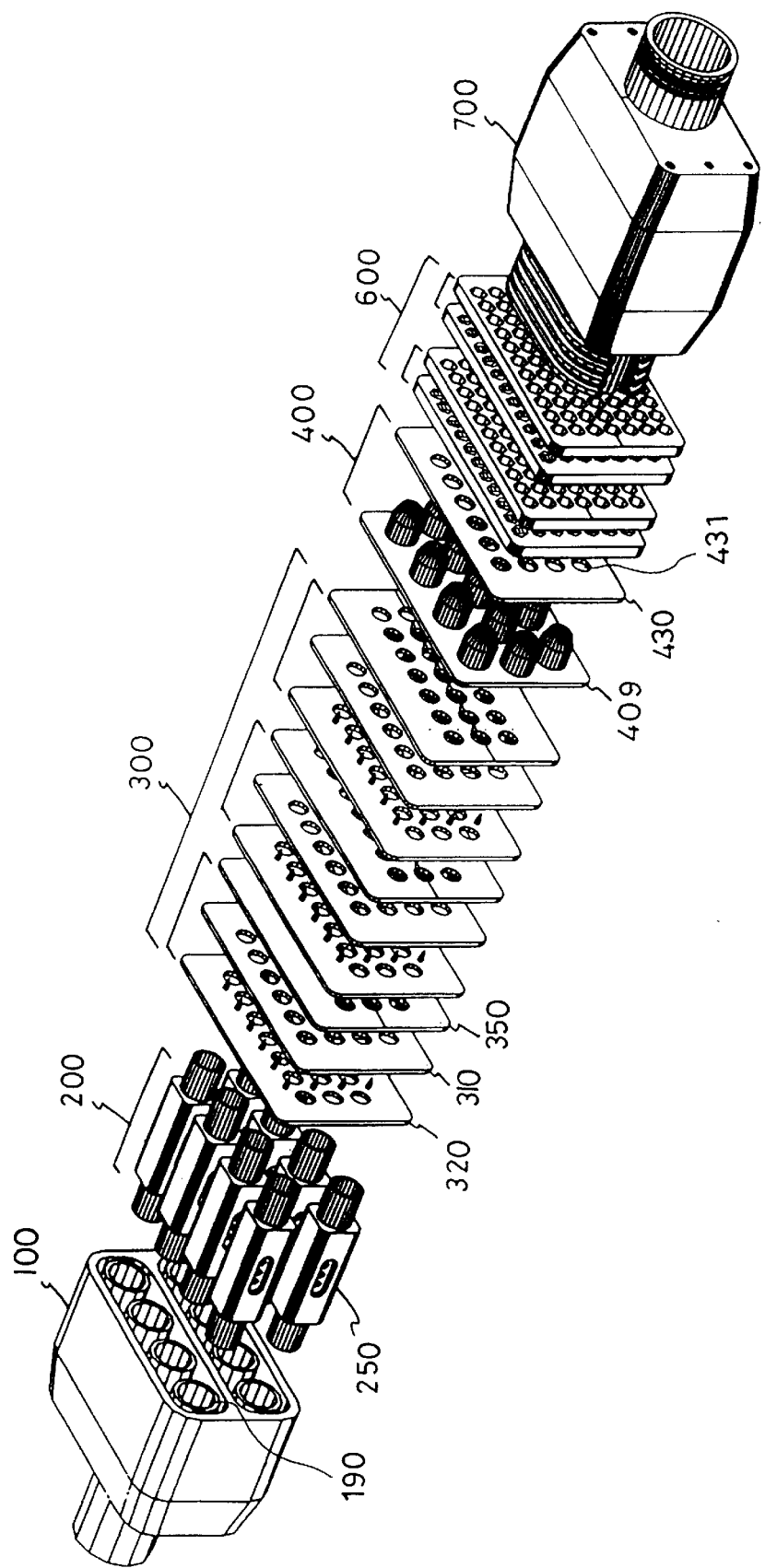
FIG. 1 is an exploded view of entire components of the inventive apparutus.

In the following, the present invention will be explained in detail referring to the drawings.

Referring to FIG. 1, which shows the entire components of the apparatus for cleaning exhaust gas according to the present invention, the apparatus comprises a partition unit (100) which renders exhaust gas to pass through at high speed and burns up large particles which have been collected in a partition unit(100), a plasma unit (200) which burns up directly granular particles by transforming them into plasma state with streamer corona, electron unit(300) which burns up minute particles by means of DC high voltage and AC high voltage, an ionization unit(400) which eliminates the noxious materials by generating a great deal of negative ions, a screen unit(600) which remove NOx by generating ozone with ultraviolet rays and ions in order to oxidize NOx into $NO_3$, which can be easily dissolved in water which is produced by Sellen's effect of PN diode(620) in screen unit(400), a union unit(700) which reduces engine noise and shields electromagnetic waves irradiated from the above-mentioned units (100, 200, 300, 400, 600), and high-frequency high voltage generator (not drawn) to supply high voltage to each unit.

Each unit will be explained in detail in the following.

Figure 2A:
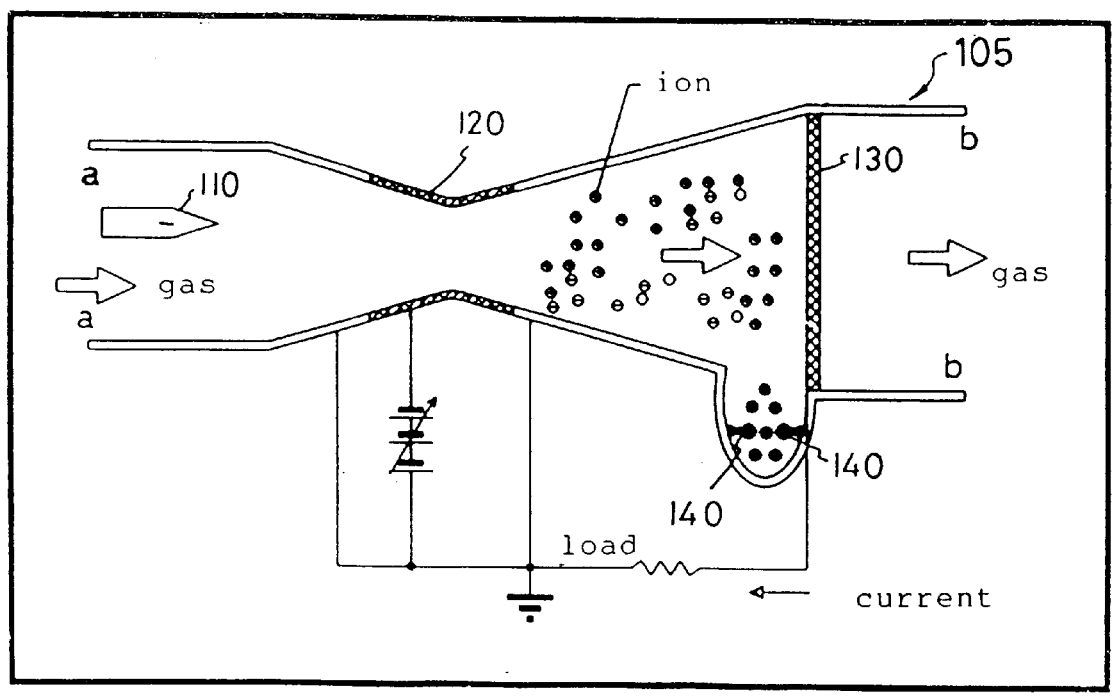
FIG. 2(a) is a schematic view showing the principle of cleaning exhaust gas in a partition unit.

A partition unit(100) is shown in detail in FIG. 2(a) and (b) and FIG. 3(a) and (b).

Referring to FIG. 2(a), illustrating working principle of a bottle-necked nozzle(105) in a partition unit(100) used to eliminate granular particles by means of slowing down the flow of exhaust gas, the partition unit(100) comprises ion pin(110) which induces high-frequency high voltage to ionize air and granular particles in exhaust gas, an attractor electrode(120) in the nozzle (105) which induces high-frequency high voltage to accelerate exhaust gas, a meshed collector electrode(130) which partitions granular particles, that is, larger particles drop down into the manhole below the meshed collector electrode(130) and small particles are passed through the collector electrode(130), and discharge poles(140) which burns up the dropped materials in manhole.

Thus the partition unit (100) in taking exhaust gas from an engine preliminarily separates exhaust gas into smoke and granular particles and then filters granular particles according to FIG. 2(a).

Figure 2B:
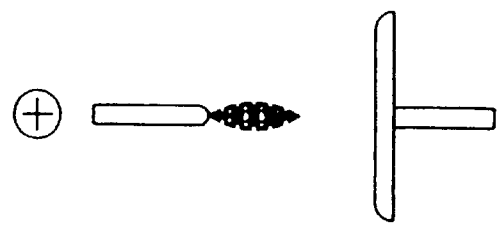
FIG. 2(b) illustrates a discharging type of a brush corona.

FIG. 2(b) shows a brush corona which is discharged form ion pin (110) to charge the granular particles in exhaust gas.

FIG. 3(a) illustrates a perspective view of partition unit guide assembly(190). These assemblies(190), as shown in FIG. 1, are arranged in a row and stacked up and down in a casing of the partition unit(100). The partition unit(100) comprises an ion pin(110) and in which occurs brush corona, an air inlet hole(150) which takes exhaust gas into a channel, a partition unit guider(160) where a bottle-necked nozzle is mounted, a partition unit pole(170) which burns up larger particles and which is mounted at discharge poles(140) below a collector electrode(130) in front of a ion pin(110), and partition unit plate(180) on which above components are mounted.

Figure 3B:
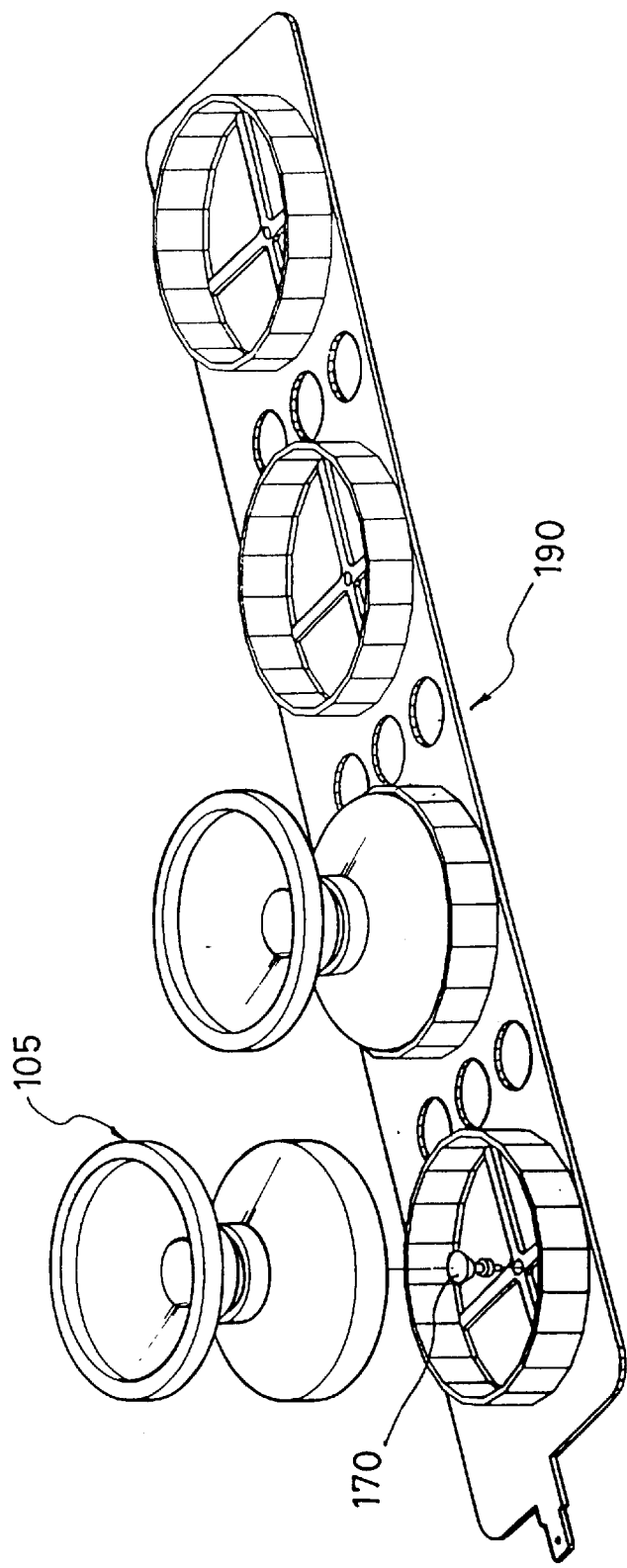
FIG. 3(b) is a perspective view of a nozzle mounted on a partition unit guide assembly.

FIG. 3(b) is a perspective view of the bottle-necked nozzle(105) mounted on partition unit guide assembly(190). Dissimilarly to FIG. 1 in which only the partition unit guide assembly(190) is assembled into the partiton unit(100), there can be attached the bottle-necked nozzle(105) at the partition unit guide assembly(190) as seen from FIG. 3(b). As shown in FIG. 2(a), the partition unit pole(170) may be substituted for ion pin(110).

Figure 4A:
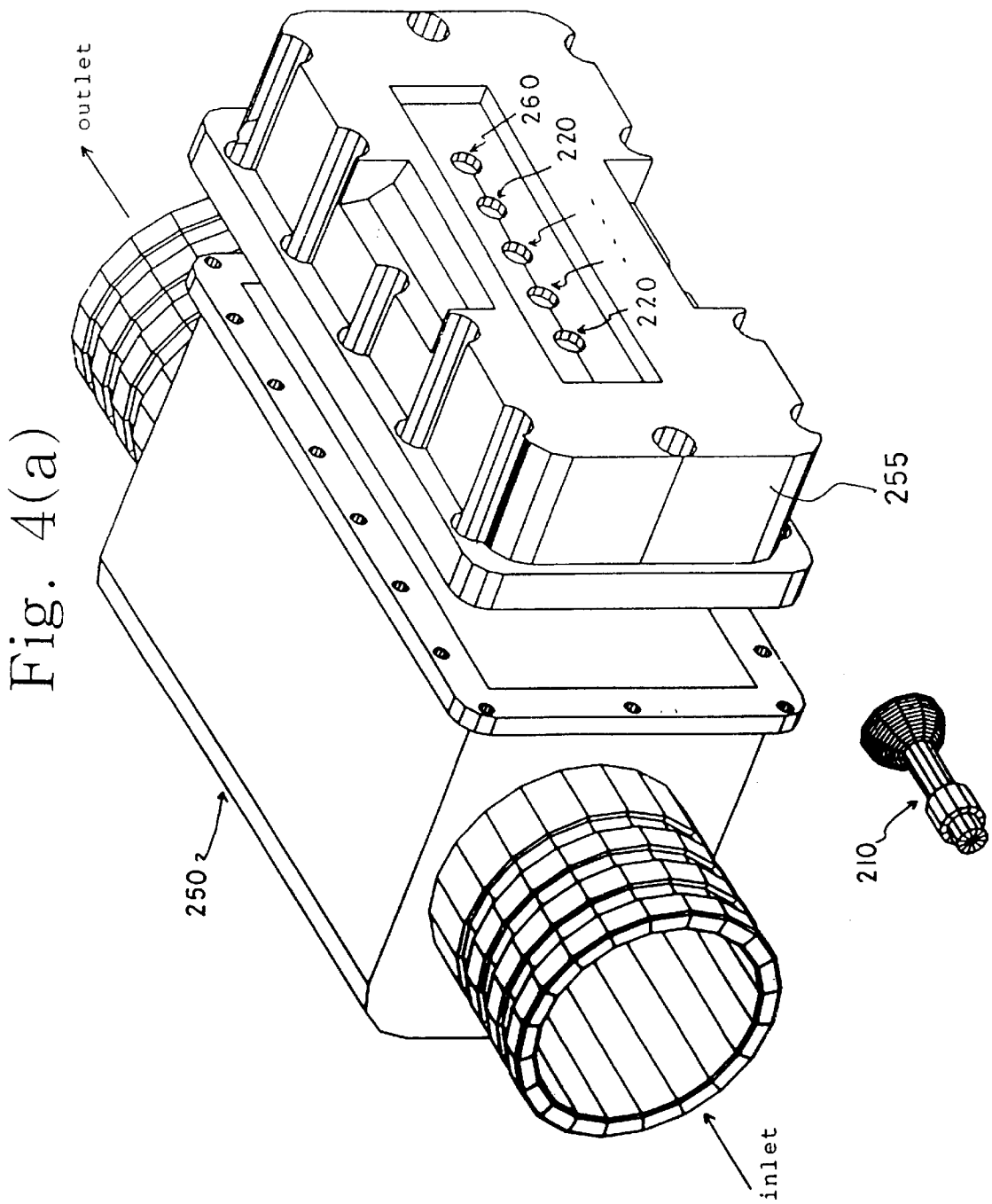
FIG. 4(a) illustrates a discharging view of a plasma unit cell.
Figure 4B:
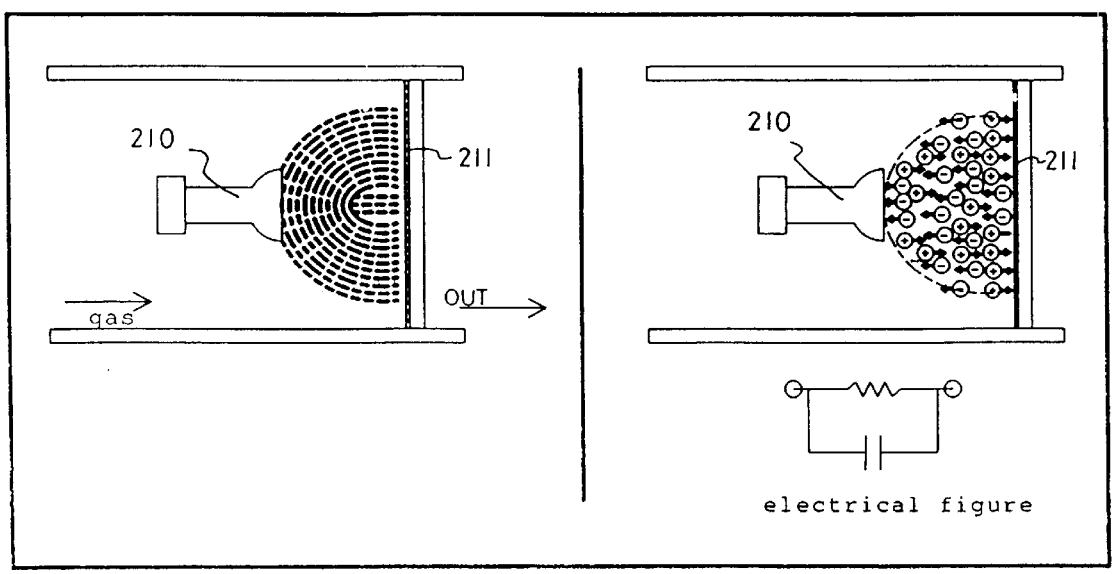
FIG. 4(b) illustrates a discharging type of streamer corona in a plasma unit cell.

FIG. 4(a) shows a unit cell(250) of the plasma unit(200) which is composed of several unit cells, wherein a plasma unit cell(250) comprises several plasma unit poles(210) in hemispheric shape which generate streamer corona to burn up the particles passed through the collector electrode(130)

of the partition unit(100), several pole holes(220) in which the above plasma unit poles(210) are inserted, meshes (211), not shown in FIG. 4(a), which act as a discharge electrode of the plasma unit pole(210) and a ground hole(260) which is connected to the meshes(211). FIG. 4(b) shows the streamer corona which is generated between the plasma unit pole(210) in the plasma unit cell(250) and meshes used as an opposite electrode(211). For example, if the unit pole(210) and the opposite electrode(211) are supplied with high voltage such as +10 KV and −10 KV respectively, streamer discharge phenomenon occurs between each pole, namely, unit pole(210) and opposite electrode(211) as shown in FIG. 4(b). The electric figure of electron moving status in such a streamer discharge phenomenon is shown in the right side of FIG. 4(b).

Plasma is a highly ionized gas in which particles carrying a positive or negative electric charge exist equivalently in a differentiated state and which is of high density and entirely maintains electric neutrality. Especially streamer corona as illustrated in FIG. 4(a) is an electric discharge phenomenon in which luminous portions are seemingly mingled with each other between both electrodes. In other words, it is an electric discharge phenomenon in which luminous portions are widened in appearance since fine light flux is gathered together.

Figure 4C:
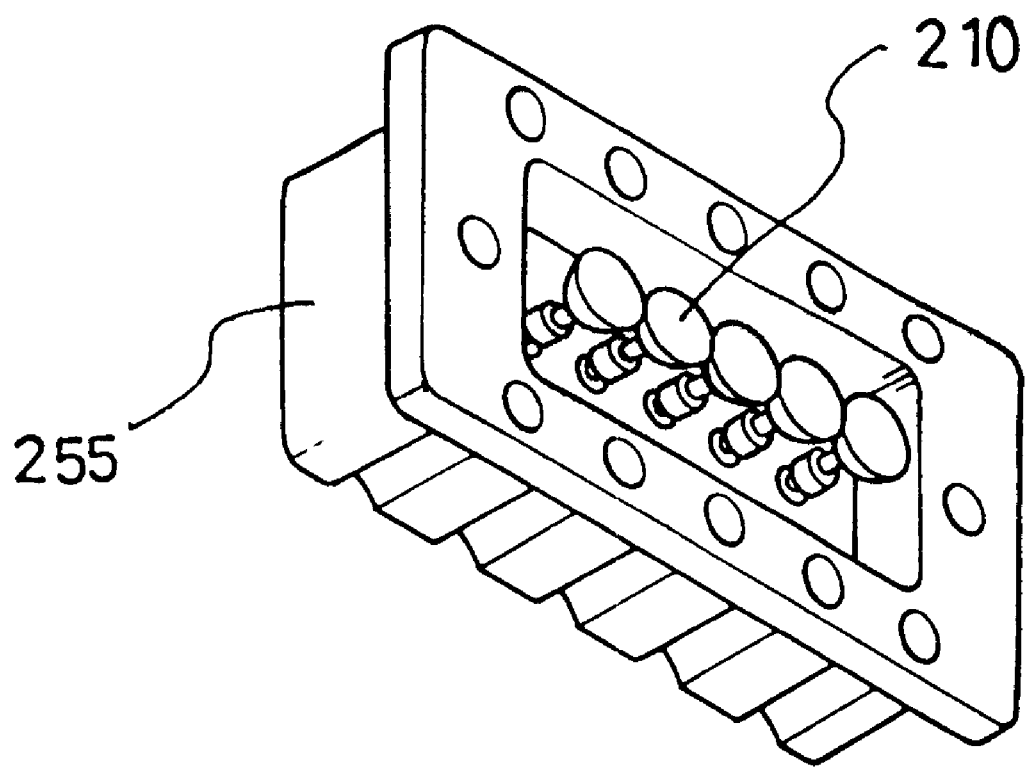
FIG. 4(c) is a perspective view of a plasma unit pole mounted in the inner space of a connecting cap of a plasma unit cell.

In order to utilize such a corona discharge, as shown in FIG. 4(b), the plasma unit pole(210) is installed in line with the flow passage of the plasma unit cell(250) and the meshes(211) which may be served as an opposite electrode is installed on the flow passage. On the contrary, plasma unit pole(210) inserted, as shown in FIG. 4(c), into the pole hole(220) of the connecting cap(255) mounted vertically to the flow passage of plasma unit cell(250) and opposite electrode(not shown) mounted on the inner periphery opposite to the pole(210) can be used for above corona discharge.

Also, unless the exhaust gas reduction efficiency is required to be maintained at high level, meshes(211) used as an opposite electrode can be removed. This means that although the plasma unit pole(210) is installed in any direction for example, in a vertical, horizontal or reverse direction to the flow passage of exhaust gas, much the same exhaust gas reduction efficiency and capacity can be acquired. Both of the electrodes(210, 211) of the plasma unit cell(250) should be supplied with high-frequency high voltage in order to generate a streamer corona and thus the pointed end of the plasma unit pole(210) is dense with electrons thereby to generate corona plasma such as arc discharge caused by movements of electrons initiated with their inertia force by self-vibration.

Figure 5A:
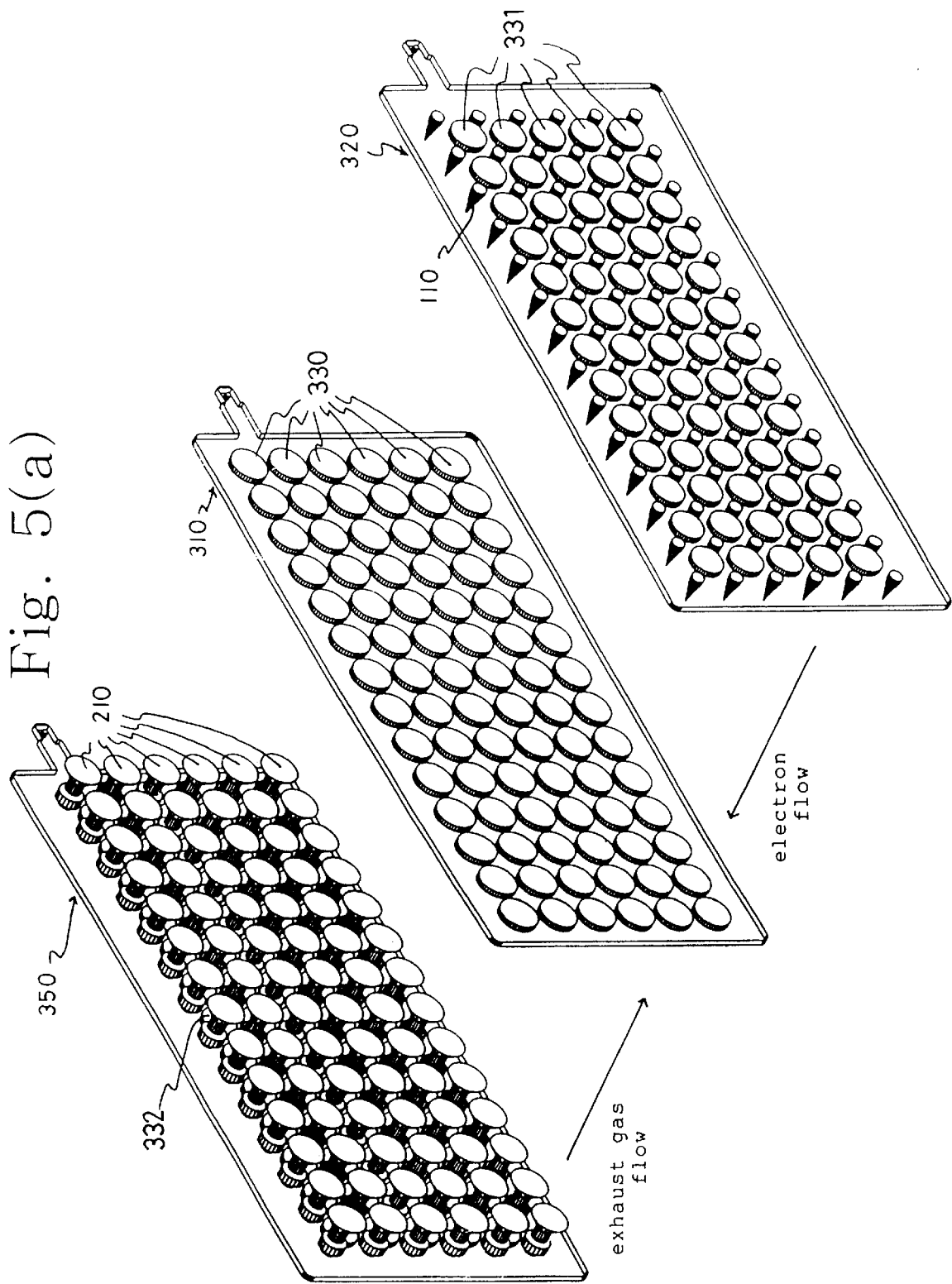
FIG. 5(a) is an exploded perspective view of an electron unit.

As shown in FIG. 5(a), the electron unit(300) for burning up minute particles with DC and AC high voltage comprises hole plate(310), ion pin plate(320) and pole-plate(350) as one of unit set having set having same size.

The hole-plate(310) is a plate having a plurality of air inlet holes(330) arranged at regular intervals in every direction and each hole(330) makes the flow of exhaust gas smooth and meshes(211), not shown in FIG. 5(a), mounted at the inlet hole(330) makes the flow of electrically charged particles smooth and at the same time acts as an electric discharge electrode.

The ion pin plate(320) applied with high-frequency high voltage is also a flat plate with which a plurality of ion pins(110) are provided at the positions coaxial to the center of the air inlet holes(330) in the same number thereof.

By the way, each ion pin(110) generate a number of electrons thereby to occur an electron wind, which causes a large number of ions to make it easy to capture the particles in the exhaust gas. Thus the ion pin plate(320) should be provided with a plurality of air inlet holes(331) located at the geometrical center of any rectangle formed with 4 ion pins(110) adjacent to each other in every direction in order to make the flow of exhaust gas smooth similarly to above.

The pole-plate(350) equally sized to the hole-plate(310) and ion pin plate(320) has a plurality of plasma unit poles (210) attached to the same location where the ion pin(110) of the ion pin plate(320) is located.

These plasma unit poles(210) are caused to discharge a streamer corona for burning up electrically charged particles captured by themselves. The pole-plate is also provided with a plurality of air inlet holes(332) at the center of any rectangularly positioned 4 unit poles(210) similarly to the plate(320) for the purpose of maintaining a good flowing condition of electrically charged particles.

Figure 5B:
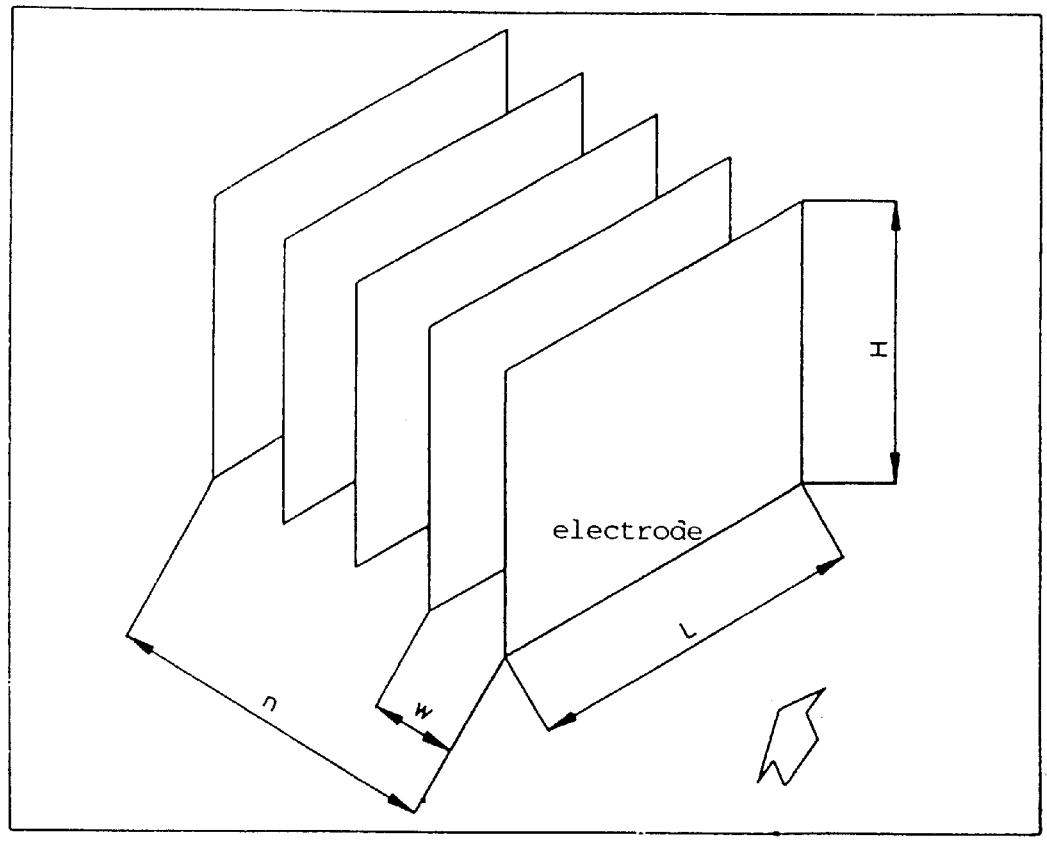
FIG. 5(b) is a schematic view to calculate the distance between high voltage electrodes at soot clean-up space.

FIG. 5(b) shows the embodiment that the above plates (310, 320, 350) are disposed in a electron unit(300). These plates(310,320,350) as an electrode or an opposite electrode are possible to be installed it any direction such as in a vertical, horizontal or reverse direction against the flow of exhaust gas and the design of these plates can be varied to secure the durability and reliability. Also, both electrodes can be shaped in a various form such as circular, vertical or elliptic type of shape.

Practically, the efficiency of cleaning exhaust gas depends on size, shape, disposition of the plates(310, 320, 350) and applied voltage and current.

The appropriate are of cleaning exhaust gas in a electron unit(300) is characterized by:

S=WNH wherein distance between plates(310, 320, 350) is W, the height of plates(310, 320, 350) is H, the amount of exhaust gas is L, and the cross-sectional area for cleaning exhaust gas is S, if space is composed of n plates.

The space between plates(310, 320, 350) in a lane, and the area of one lane is 2LH so that the total area of cleaning exhaust gas in a electron unit(300) is as as follows.

A=2NLF

CD-7KV is applied to each ion pin plate(320) and hole-plate (310) to ionize the minute particles by a ion pin(110) on the ion pin plate(320) and then to deposit the ionized particles on the meshes(211) of the hole-plate(310) and to cause electron wind between a ion pin plate(320) and a hole-plate(310).

High voltage pulse of 10 KV is applied to pole plate(350) to generate streamer corona to burn up the particles collected on meshes(211).

Figure 5C:
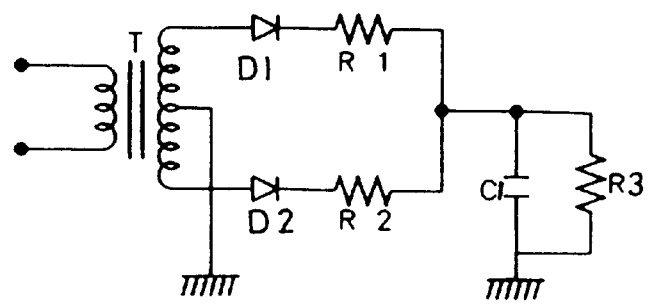
FIG. 5(c) and FIG. 5(d) schematically illustrate a circuit to supply DC high voltage to an ion pin.

FIG. 5(c) is a circuit which supplies DC voltage to an ion pin(110) mounted on an ion pin unit plate(320), comprises a transformer(T) to multiply voltage, a rectifying diode (D1, D2), a filtering resistor(R1, R2) to attenuate a ripple signal, a resistor (R3) the time constant of this circuit and capacitor (C1) which determine the time constant of this circuit.

Figure 5D:
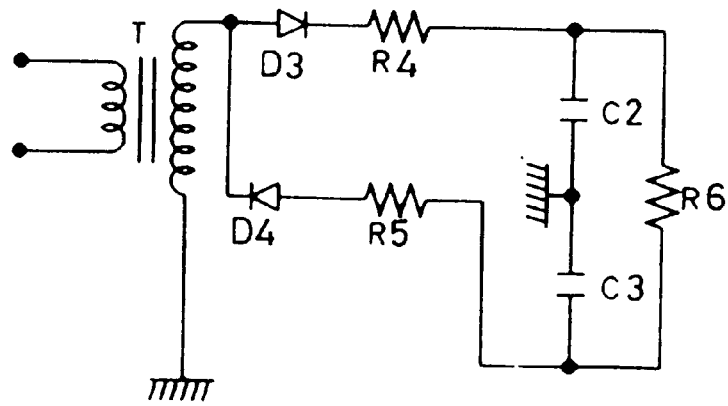

FIG. 5(d) is another circuit which supplies DC voltage to an ion pin(110) mounted on a ion pin unit plate(320). A circuit comprises a transformer(T) to multiply voltage, a rectifying diode(D3), resistor(R6) and capacitor(C2) which determine the time constant of this circuit when positive voltage is applied, and resistor(R5) and capacitor(C2) which determine the time constant of this circuit when negative voltage is applied.

Here, electric field(E) generated at a ion pin(110)

$$E = \frac{V}{R(RC/RD)}$$

V: voltage applied at a ion pin(110)
R: the radius of corona discharge generated at a ion pin(110)
RD: the radius of discharging current generated at an ion pin(110)
RC: the radius of meshes(211) set up on an air inlet hole(150).

Figure 6:
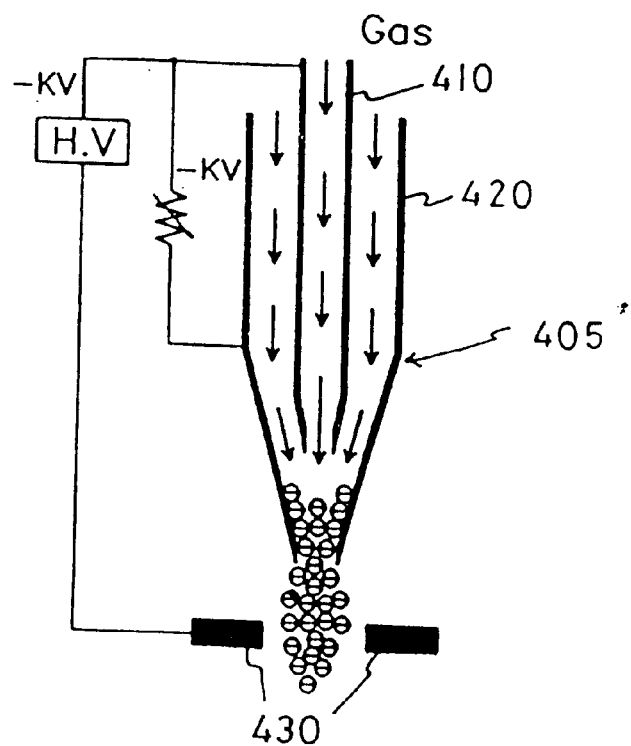
FIG. 6 is a schematic cross-sectional view of an ionization cell illustrating a generating type of plasma jet.

Referring to FIG. 6, the ionization unit(400) comprises many ionization cells(405) composed of an inner pipe(410) and an outer pipe(420) disposed coaxially to the inner pipe(410) where gas passes through at high speed, and a hole-plate(430) served as an opposite electrode applied with high vlotage. Both of the inner and out pipes(410, 420) are formed into a tapered off cylinder like a syringe.

Figure 7:
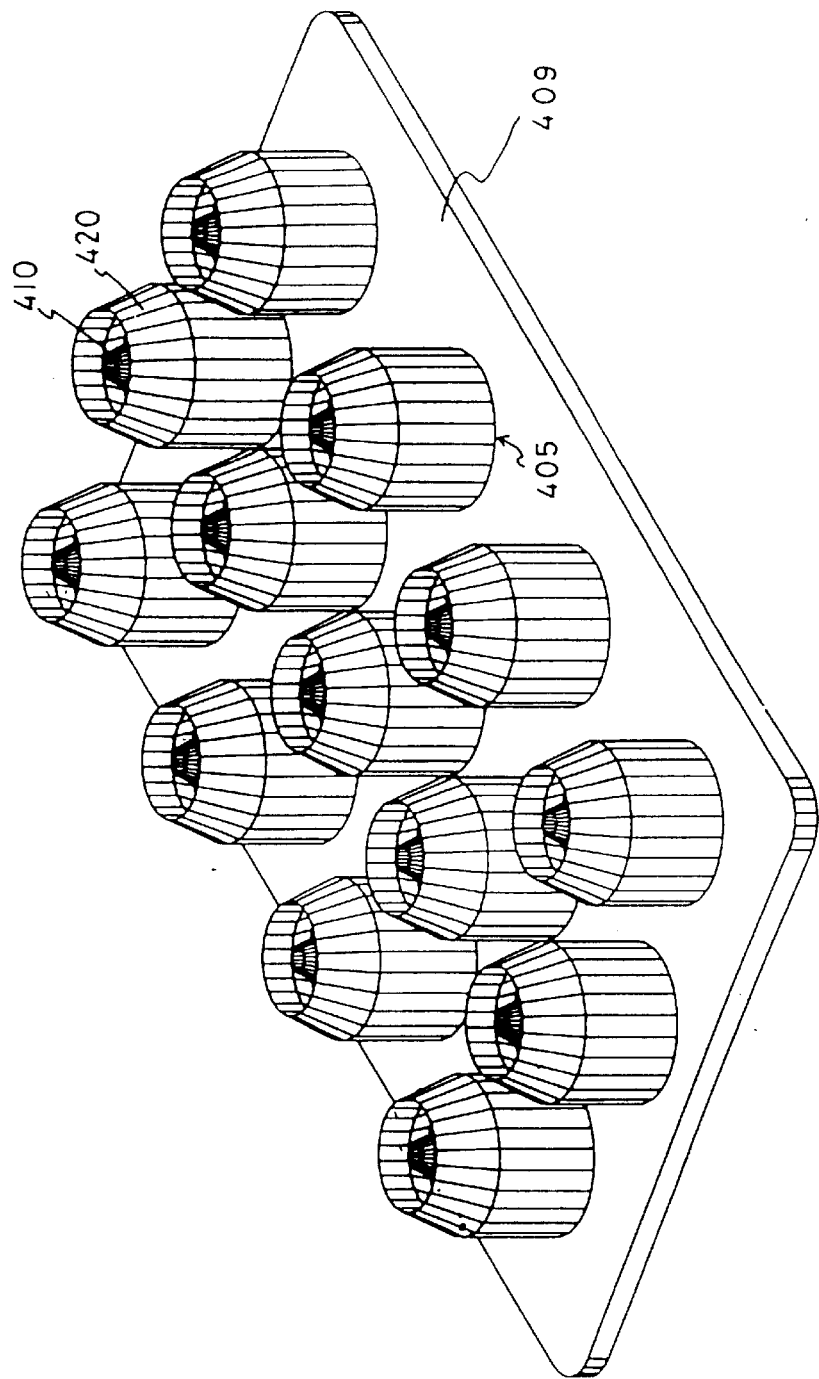
FIG. 7 is a perspective view of a plurality of ionization cells mounted on a cell-plate.

The hole-plate(430) which acts as a opposite electrode can be shaped into a flat plate as shown in FIG. 1 and provided with a plurality of air inlet holes(431) which equal in number to the ion pin plate(320) of the electron unit(300). A plurality of ionization cells(405) are attached to the cell plate(409) assuming the form of flat plate as seen from FIG. 7 in the case of applying in practice to the exhaust gas cleaning apparatus as shown in FIG. 1 and each ionization cell(405) is attached to the location centered on the axis passing through the center of any rectangle formed with 4 adjacent air inlet hole(431).

Figure 8:
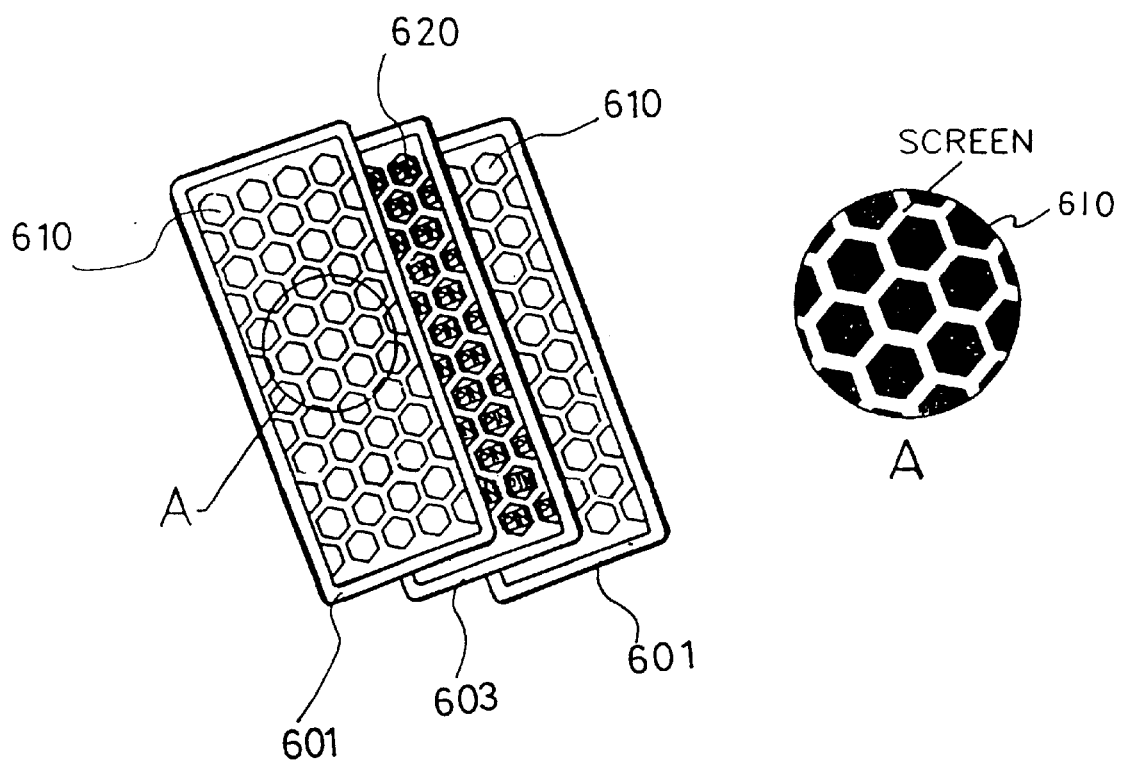
FIG. 8 is a detailed view showing one of the assembling type of a screen unit.

FIG. 8 shows are set of screen unit(600) which is composed of several sets. Each set of screen unit has the first plate(601) made of ceramic material coated with metal film which is 20–30 $\mu$m thick and formed with hexagonal hole (610) shaped as honeycomb, depicted in detail by A, to generate UV rays and the second plate(603) having PN diode(620) inserted into the hexagonal holes(610) formed in the same way of the first plate(601) in order to remove NOx gas with moisture generated by temperature drop of the exhaust gas. The screen unit(600) comprises the first and the second plate(601, 603) stacked one by one as a module. At this time, the operating system voltage of the PN diode(620) is 0.7 V. Accordingly, the number of diodes which is needed, N, is specified as $$N = \frac{DC\ Voltage(V)}{0.7\ V}$$

Figure 9A:
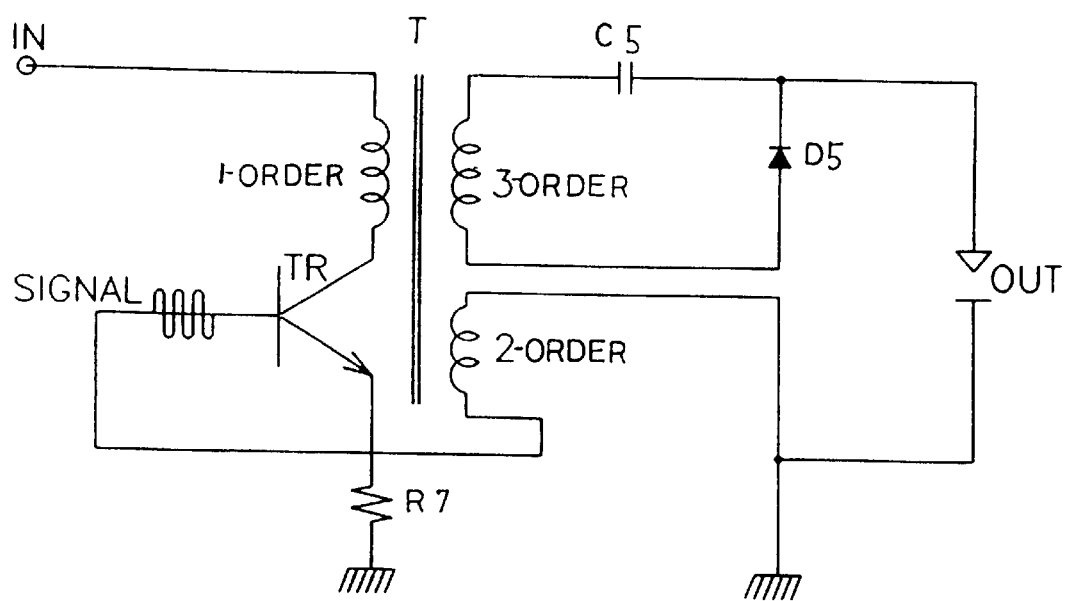
FIG. 9(a) is a circuit of high-frequency high voltage generator.

FIG. 9(a) shows a high-frequency voltage generator, wherein it comprises a first order coil applied with AC voltage, a transistor(T) to amplify signal, bias resistor(R7) to stabilize operation, a third order coil applied with high voltage according to the turns ratio, a second order coil to modulate carrier having 50 KHz–100 KHz, a voltage multiplier circuit (D5), and capacitor(C5) to charge a third order voltage.

Figure 9B:
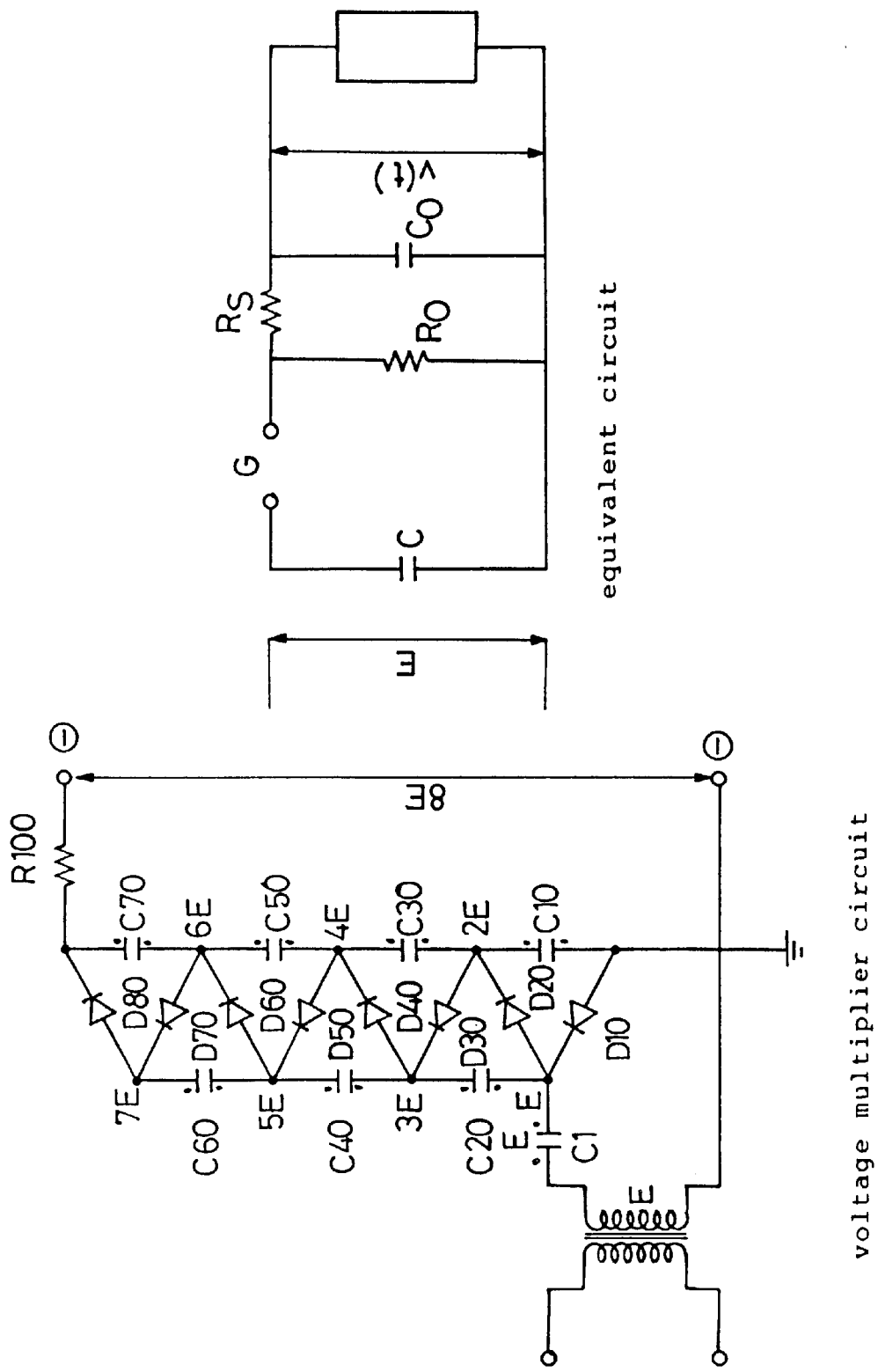
FIG. 9(b) is a voltage multiplier circuit to multiply voltage applied across a third order cell.

FIG. 9(b) shows a voltage multiplier circuit(D5) in detail shown in FIG. 9(a), which comprises a third order coil to induce high voltage according to turns ratio, diode (D10, ... D80) to rectify AC voltage, high voltage is charged across capacitor (C5, ... , C70).

And the equivalent circuit of a voltage multiplier circuit (D5) is shown.

Figure 10:
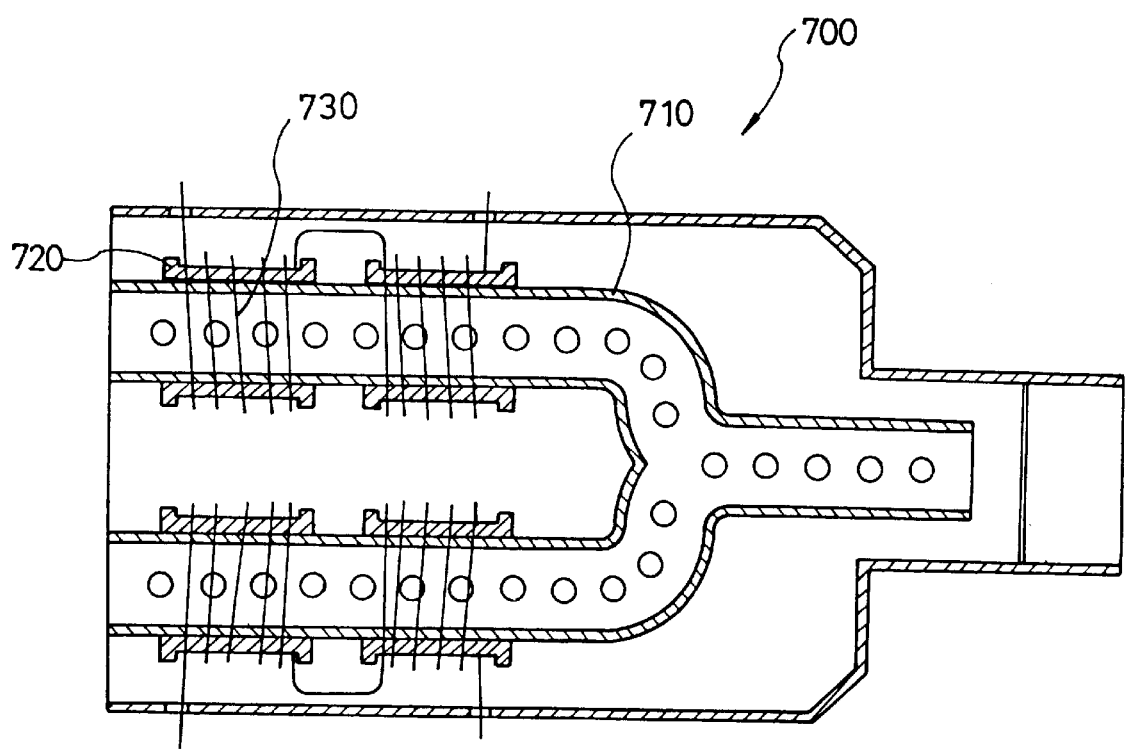
FIG. 10 is a horizontal sectional view of a union unit.

FIG. 10 shows the horizontal section of the union unit (700). This unit(700) comprises a mechanical-electric filter, to absorb engine noises and to shield electromagnetic waves to be radiated from corona discharge process.

Namely, this unit is used to meet the regulations of EMI, EMC specification of this inventive apparatus. B4 inserting a plurality of ferrite cores(720) into metal house(710) and by winding wire (730) around ferrite cores (720), this unit (700) shields EMI and EMC.

To shield EMI, EMC effectively, a wide range L and C with resonant frequency is recommended. A fine ceramic material can be substituted for the metal house(710) and ferrite material can be used for the cores(720) mounted outwardly to the metal house(710).

This ferrite cores(720) are divided into 2 groups one of which is operated for a positive magnetic field and another of which is operated for a negative magnetic field so as to shut off the electromagnetic waves found near the exhaust port. Also, as shown in FIG. 11, the entire external housing is prefered to have an exhaust port bended towrad the ground and is more effective when used duplicately in parallel arrangement.

Figure 11:
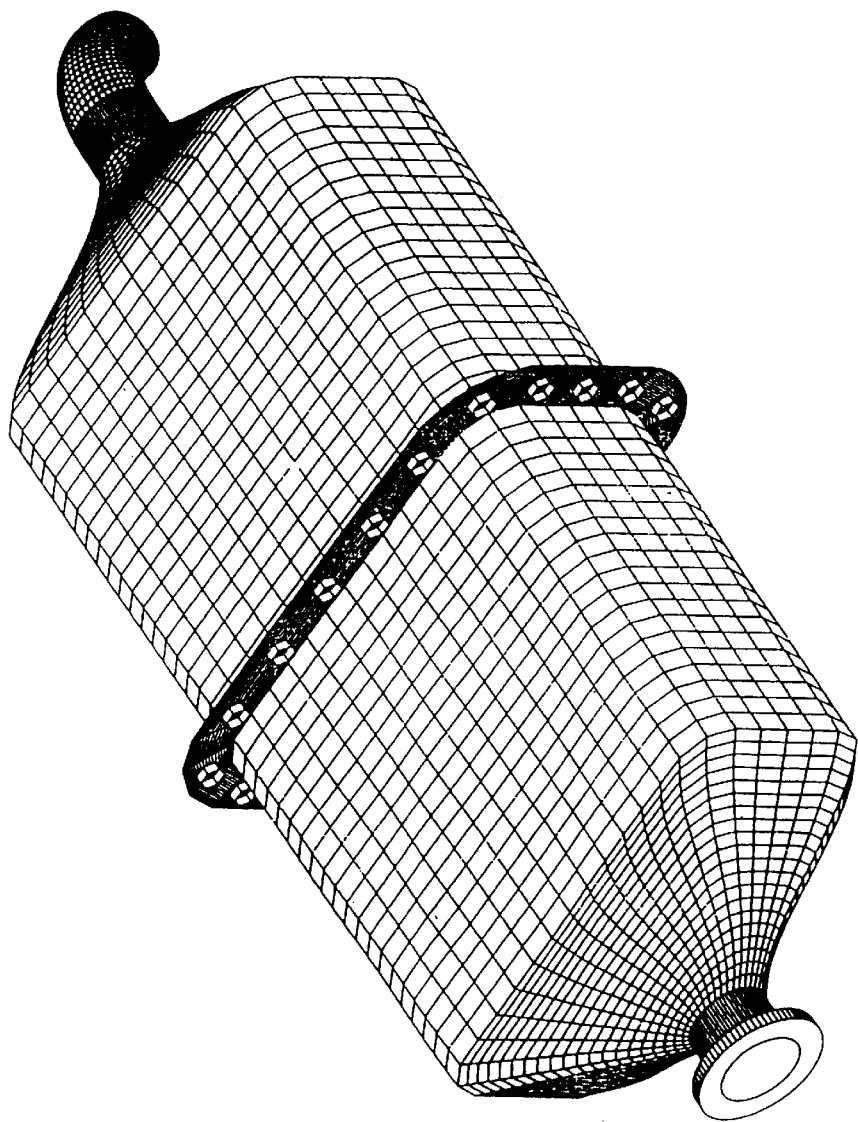
FIG. 11 is an external perspective view of the whole apparutus according to the present invention.

FIG. 11 shows the entire external form of the present invention, which is housed with metal in order to cut off the outer impact and to prevent irradiating engine noise and electromagnetic waves caused by each unit.

The outlet of the case is forwarded to the ground. The operation of the apparatus in the present invention will be explained in the as follows.

Partition unit (100) takes exhaust gas pushed out from an engine and sends it to the plasma unit (200) fluidly. In the partition unit (100), EHD (electro-hydro dynamics) method is applied between inhaling site (a—a) and exhaling site (b—b) to accelerate the flow of exhaust gas and electrostatic method of Coulomb's force is used. Exhaust gas mixed with air is inhaled into the partition unit (100), and the granular particles in exhaust gas are decomposed and ionized into negatively charged particles. The negatively charged particles pass through the bottle-necked nozzle, where the speed of the gas accelerates by means of EHD method.

In addition, negatively charged particles accelerate much more by voltage difference between the ion pin (110) and then attractor electrode (120) induced negatively, and this phenomenon prevents exhaust gas from staying or slowing down in the partition unit (100). We call the above process as EHD (electro-hydro dynamics) method. Exhaust gas after passing thorough the nozzle is diffused to a collector electrode (130), where the diffusion theory of wave guide is applied. That is, exhaust gas diffused after passing through a narrow space can spread widely without slowing down of the speed. The negatively charged particles are attracted by electrostatic force on the collector electrode (130) which is made of metal mesh and larger particles which can not pass through the collector electrode (130) of metal mesh (211) drop down into the manhole where one set of discharge poles (140) are disposed to burn up large particles.

Large particles in exhaust gas are eliminated by burning up in the manhole where small particles may pass through the collector electrode (130). It is preferred that the partition unit pole (170) has a round head in shape to increase ignition energy.

The high speed of exhaust gas is helpful in preventing the collector electrode (130) from being filled up with small particles.

In the plasma unit (200), particles are burned by applying plasma process, that is to say, particles which have been passing through the collector electrode (130) are burned up again while passing thorough the plasma cell (250), where plasma means that particles are divided into positive and negative particles, of which the amounts are the same, and therefore they show neutral state in total. Small particles which can pass thorough the collector electrode (130) are burned up in a plasma unit cell (250) by streamer corona generated between a plasma unit pole (210) applied with + voltage and mesh (211) applied with − voltage.

At this time, since the plasma generated at the plasma unit (200) have a tendency to maintain electric neutrality because of their equal density of positive and negative electric charge, when the high voltage is applied to the unit pole (210) and mesh (211) for a short time, particles in exhaust gas flowed into the plasma unit cell (250) are charged and burned up by flame discharge which occurs between a plasma unit pole (210) and mesh (211).

In addition, particles oscillate due to property of attracting each other by electrostatic force and this prevents the meshed net (211) filled up with particles. Further, electrons oscillate in plasma state, and electron's oscillation frequency enhance the particles oscillation.

Oscillation frequency ($f_k$) is characterized by $$f_k = 8.9 \times 10^3 \sqrt{N},$$

where N is electron density and oscillation frequency depends on air pressure.

Then, the exhaust gas passes through the electron unit (300) is provided with air inlet holes (330) for the exhaust gas to pass thorough uniformly. At this time, meshes such as the meshes (211) can be mounted to the flow passage as a discharge electrode. AC high voltage is impressed between the pole-plate (350) and the hole-plate (310) in order to generate electric wind from ion pin (100) of the ion pin unit plate (320) and thereby to push the particles toward the hole-plate (310). Thus the minute particles passing through the meshes are burned up again effectively by the corona discharge generated between the hole-plate (310) and the pole-plate (350).

The above-mentioned process will be explained systematically in the following.

The noxious materials in exhaust gas are nearly cleared by several steps, wherein large particles are preliminary burned up to be removed in the partition unit (100), and then small particles passed through the partition unit (100) are removed in plasma unit (200) by streamer corona, and then minute particles are eliminated in electron unit (300).

There are noxious chemical materials in exhaust gas, and two different methods are used to remove noxious chemical materials in the present invention.

First, noxious materials are removed with negative ions generated by ionization unit (400). Ionization unit (400) which generates ultraviolet rays between outer pipe (420) and opposite electrode (430), and thus ultra-violet rays generate lots of negative ions.

While the general negative-ion generator has a pointed-end in order to produce negative ions, negative ion generator of the present invention has an ionization cell (405) structure which has inner cylindrical wall dividing the space into two routes, that is, inner pipe (410) and outer pipe (420) in addition to the known form. By the above-mentioned ionization cell (405) structure, the negative ion generator of the present invention emits more negative ions several thousand times than the usual negative ion generator, while the noxious gases pass through at very high speed.

We call this method as plasma jet, where the appropriate distance between outer pipe (420) and opposite electrode (430) should be maintained in order to generate negative ions in a larger amount.

Corona is also generated at the pointed end of plasma jet, and its temperature is 800° C.–1500° C.

The noxious material molecules are excited by ultra-violet rays and the excited noxious materials combine negative ions and ozones to be changed into other materials. And in this process noxious positive ions are also removed.

In order to remove NOx which is not removed in the above-mentioned ionization unit (400), screen unite (600) is used in the present invention.

The screen unit (600) comprises the first place (601) and the second plate (603) having hexagonal holes (610) in which PN diodes (620) are disposed.

When 10 K voltage is impressed to plates, ultra-violet rays are generated around hexagonal hole (610) in a larger amount, and ultra-violet rays let $O_2$ be changed into ozone.

Ozone is generated in a large amount when thickness of metal is 20 $\mu$m–30 $\mu$m.

The impedance matching is important, since the printed metal may be separated form ceramic plate, if higher voltage than 1 KV is impressed for a long time.

Also the separation of the printed metal from ceramic plate can be prevented by scratching the ceramic plate.

Such an apparatus has been used for sterilization of food or for generator of ozone, but it has been never used for eliminating of smoke.

In addition, PN diode (620) mounted in hexagonal holes (610) of plate B (640) cause temperature dropping by Sellen's effect to condense $H_2O$ into water.

Ultra-violet rays are generated in a large amount when high voltage is impressed to the coated surfaces of the first plate (601) and the second plate (603) faced to each other, and the ultra-violet rays make oxygen into ozone which renders NOx and $NO_3$ which can be easily dissolved in water.

During this process, the efficiency of removing NOx will be enhanced by taking air into plates and connecting the PN diodes (620) in serial and parallel arrangement. The method of dropping temperature by using PN diodes (620) is called as Sellen's effect and this method has been used for refrigerator, but has never been used for eliminating smoke.

Most of noxious chemical gas in exhaust gases is removed in the ionization unit (400) and a NOx, which is not filtered in the ionization unit, is removed through the screen unit (600).

Therefore, the granular ingredients and noxious chemical gas of exhaust gases are completely purified.

A high voltage generator with a high frequency comprises by a high frequency oscillator and a high voltage rectifier with transformer.

The high voltage generator with a high frequency of this invention supplies positively and negatively polarized high voltage.

A high voltage generator in the present invention is different form the usual one in the point that it has a special circuit which needs an isolation strength and a feedback circuit to shutdown a first order coil voltage, if a second order coil is abnormal.

This high voltage generator shown in FIG. 9 (a) comprises a transistor to amplify a modulated signal, a thirdly order coil to induce a high voltage, a secondly order coil to shutdown a first order coil voltage, when second order coil does not work well, a capacitor (C5) to charge voltage, and a voltage multiplier circuit (D5) to multiply a voltage.

A voltage multiplier circuit (D5) is used to multiply voltage needed for the above-mentioned units (100, 200, 300, 400, 600), wherein E is a charged voltage across a capacitor (C5), 2E is a charged voltage across a capacitor (C10), 3E is a charged voltage across a capacitor (C20), 4E is a charged voltage across a capacitor (C30), 5E is a charged voltage across a capacitor (C40), 6E is a charged voltage across a capacitor (C50), 7E is a charged voltage across a capacitor (C60), 8E is a charged voltage across a capacitor (C70).

A ceramic resistor filter (R100) is used to prevent circuit breakdown, and to avoid dangerous situation which are caused by the remaining high voltage across capacitor (C10, . . . , C70) in case of a third order coil voltage "OFF".

As modulating a carrier (400 KHz) and a signal (50 KHz–100 KHz) at a second order coil, a transistor outputs specially high voltage without excessive current. To reverse an output voltage polarity, the connection of diode (D10, . . . , D80) is reversed.

As E is a charged voltage across a capacitor (C5), discharge voltage (Vo)

$$Vo = \frac{C_1 E}{C_1 + C_2}\left(1 - e^{\frac{C_1 + C_2}{C_1 + C_2 R_s}(t)}\right)$$

This invention can contain a union unit (700), which comprises a mechanical-electric filter, to absorb engine noises and to shield electromagnetic waves to be radiated from corona discharge process.

Namely, this unit is used to meet the regulations of EMI, EMC specification of this inventive apparatus. By inserting ferrite cores into metal house and by winding wire around ferrite cores, this unit (700) shields EMI and ECM.

To shield EMI, EMC effectively, a wide range L and C with resonant frequency is recommended.

As above-mentioned, this invention relates to a method and an apparatus to clean exhaust gas of an internal combustion engine, and external combustion engine and anti-pollution equipment and so on. A this invention can clean exhaust gas and reduce noise, it can be substituted for a noise absorber, for example, the muffler of automobiles.

What is claimed is:

1. A method for cleaning exhaust gas by using a high voltage field, which comprises the successive steps:
    (a) partitioning granular particles in the exhaust gas by means of ionizing the granular particles present in the exhaust gas by using electric discharge and then diffusing the exhaust gas at high speed by using a bottle-necked attractor electrode and burning up large granular particles with corona discharge;
    (b) burning minute granular particles, which are not removed in step (a), under plasma atmosphere;
    (c) further burning the minute particles by using AC voltage and DC voltage;
    (d) removing noxious gas component present in the exhaust gas with negative ions generated by an ionization unit; and
    (e) oxidizing $NO_x$ present in the exhaust gas with ozone generated by an ultraviolet ray and removing oxidized $NO_x$ by dissolving the same in $H_2O$ generated from heat exchange with PN diodes.

2. A method of cleaning exhaust gas by using a high voltage field as in claim 1, wherein step (a) additionally comprises;
    (a') diffusing the thus-ionized particles to a collector electrode (130) at high speed by using the bottle-necked attractor electrode (120);
    (a") partitioning the diffused particles, wherein small diffused particles pass thorough the collector electrode (130) and large diffused particles drop down to be deposited in a manhole; and
    (a''') burning up the deposited large particles with electric discharge.

3. A method for cleaning exhaust gas by using a high voltage field as in claim 1, wherein the particles in the plasma state in the step (b) are burned up by using oscillary corona discharge.

4. A method for cleaning exhaust gas by using a high voltage field as in claim 3, wherein corona discharge is a streamer corona having a large discharge area.

5. A method for cleaning exhaust gas by using a high voltage field as in claim 1, wherein after step (b), step (c) comprises:
    (c') burning up the minute particles by using corona discharge generated by AC voltage; and
    (c") burning again minute particles which are not burned up in the step (c') by using DC voltage.

6. A method for cleaning exhaust gas by using a high voltage field as in claim 5, wherein corona discharge is a streamer corona having a large discharging area.

7. A method for cleaning exhaust gas by using a high voltage field as in claim 1, wherein the step (d) comprises:
    (a) generating a great deal of negative ions; and
    (b) decomposing noxious gas by using the negative ions.

8. A method for cleaning exhaust gas buy using a high voltage field as in claim 1, wherein the step (e) comprises:
    (a) generating ultraviolet rays;
    (b) oxidizing $NO_x$ with the ultraviolet rays; and
    (c) dissolving oxidized $NO_x$ in $H_2O$ which is generated by using heat exchange with PN diodes.

9. A method for cleaning exhaust gas by using a high voltage field as in claim 8, wherein the step of generating ultraviolet rays comprises:
    (a) printing an electrode circuit pattern with metal on a plate;
    (b) printing an electrode circuit pattern on an opposite electrode in a same way; and
    (c) supplying high voltage to each electrode for generating ultraviolet rays.

10. A method for cleaning exhaust gas by using a high voltage filed as in claim 9, wherein the electrode circuit pattern on the plate is printed with metal having a thickness of 10 $\mu$m–50 $\mu$m.

11. A method for cleaning exhaust gas by using a high voltage field as in claim 8, wherein the heat exchange for condensing $H_2O$ is induced by arranging the PN diodes in series or in parallel between plates.

12. Apparatus for cleaning exhaust gas of granular particles and noxious gas competent by using a high voltage field, which comprises is sequence orders:
    (a) a partition unit, which takes in the exhaust gas, ionizes particles present in the exhaust gas and then diffuses to a collector electrode where the particles are partitioned, and large particles are burned up with a corona discharge;
    (b) a plasma unit, which burns granular particles which pass through the partition unit by using a streamer corona;
    (c) an electron unit, which burns gas-borne particles by using AC voltage and DC voltage;
    (d) an ionization unit, which removes the noxious gas component by using negative ions; and
    (e) a screen unit, which oxidizes $NO_x$ present in the exhaust gas with ozone generated by an ultraviolet ray and removes the oxidized $NO_x$ by dissolving the same in $H_2O$ generated by a temperature drop induced by PN diodes.

13. Apparatus for cleaning exhaust gas as in claim 12, comprising a further union unit in addition to said units, wherein the union unit shields from electromagnetic waves and reduces noise.

14. Apparatus for cleaning exhaust gas by using a high voltage field as in claim 13, wherein the outer part of said union is formed as ferrite core for shielding electromagnetic wave and an electric field in the air.

15. Apparatus for cleaning exhaust gas by using a high voltage field as in claim 14, wherein said ferrite core is connected in 2 stages serially, of which the first stage is operated in a positive magnetic field and of which the second stage is operated in a negative magnetic field.

16. Apparatus for cleaning exhaust gas by using a high voltage field as in claim 12, wherein said partition unit comprises
   (a) as ion pin for ionizing particles with a high voltage to remove particles;
   (b) a partition unit guide to provide a smooth flow of exhaust gas;
   (c) a partition unit plate with a plurality of air inlet holes to provide a smooth flow of air;
   (d) an attractor electrode to supply voltage to a bottle-necked nozzle where the flow of exhaust gas accelerates;
   (e) a collector electrode for filtering particles; and
   (f) a partition unit pole mounted with discharge electrodes to burn up large particles dropped in a manhole.

17. Apparatus for cleaning exhaust gas by using a high voltage field as in claim 16, wherein the nozzle part acts as an electrode in whole tube.

18. Apparatus for cleaning exhaust gas by using a high voltage field as in claim 16, wherein said partition union pole is in the shape of sphere to enhance ignition of particles.

19. Apparatus for cleaning exhaust gas by using a high voltage field as in claim 12, wherein said plasma unit contains a plurality of plasma unit cells comprising
   (a) a plasma unit pole to generate a streamer corona; and
   (b) a meshed not to act as discharge electrode.

20. Apparatus for cleaning exhaust gas by using a high voltage field as in claim 19, wherein said streamer corona occurs between said plasma unit pole and said meshed net.

21. Apparatus for cleaning exhaust gas by using a high voltage field as in claim 19, wherein said plasma unit pole is hemispheric and has one side which is flat to cause streamer corona.

22. Apparatus for cleaning exhaust gas by using a high voltage field as in claim 12, wherein said electron unit contains a plurality of sets, wherein one set comprises
   (a) an ion pin plate having an air inlet hole mounted with ion pins to generate an electric wind;
   (b) a hole plate having an air inlet hole mounted with meshed net which acts as an opposite electrode; and
   (c) a pole plate mounted with plasma unit poles generating a steamer corona.

23. Apparatus for cleaning exhaust gas by using a high voltage field as in claim 22, wherein said ion pin plate is a matrix structure comprising
   (a) an ion pin to generate electric wind; and
   (b) an air inlet hole for smooth air flow.

24. Apparatus for cleaning exhaust gas by using a high voltage field as in claim 22, wherein said hole plate is formed with a number of air inlet holes of meshed net for smooth air flow.

25. Apparatus for cleaning exhaust gas by using a high voltage field as in claim 12, wherein said ionization unit cells generating negative ions and ultraviolet rays by plasma jet formed as a cylindrical outer pipe and cylindrical inner pipe with a sharp pointed-end.

26. Apparatus for cleaning exhaust gas by using a high voltage field as in claim 25, wherein said ionization unit comprises
   (a) a cell plate with an ionization cell having a matrix form; and
   (b) a hole plate having an air inlet hole in which meshed net is cross-sectionally mounted.

27. Apparatus for cleaning exhaust gas by using a high voltage field as in claim 12, wherein said screen unit comprises a first plate and a second plate and arranged with PN diodes to drop temperature.

28. Apparatus for cleaning exhaust gas by using a high voltage field as in claim 27, wherein each plate has a great deal of polygonal holes for generating ultraviolet rays effectively.

29. Apparatus for cleaning exhaust gas by using a high voltage field as in claim 28, wherein the ultraviolet rays are generated from hexagonal holes when supplying power to the plates.

30. Apparatus for cleaning exhaust gas by using a high voltage field as in claim 27, wherein said first plate and second plate used as an electrode have a plurality of hexagonal holes.

31. Apparatus for cleaning exhaust gas by using a high voltage field as in claim 27, wherein said PN diodes are connected in a serial or parallel to induce a Sellen's effect temperature drop.

* * * * *